United States Patent [19]

Gianzero

[11] Patent Number: 4,481,472
[45] Date of Patent: Nov. 6, 1984

[54] PULSED INDUCTION LOGGING FOR DETERMINING CONDUCTIVITY AND INVADED ZONE PROPERTIES

[75] Inventor: Stanley Gianzero, Austin, Tex.

[73] Assignee: Schlumberger Technology Corporation, New York, N.Y.

[21] Appl. No.: 294,124

[22] Filed: Aug. 19, 1981

[51] Int. Cl.³ .............................................. G01V 3/28
[52] U.S. Cl. .................................................... 324/339
[58] Field of Search ................ 324/334, 337, 338–341, 324/343, 360

[56] References Cited

U.S. PATENT DOCUMENTS

| | | | |
|---|---|---|---|
| 3,090,910 | 5/1963 | Moran | 324/339 |
| 3,849,721 | 11/1974 | Calvert | 324/338 |
| 4,100,483 | 7/1978 | Thompson et al. | 324/341 |
| 4,130,793 | 12/1978 | Bridges et al. | 324/341 |

Primary Examiner—Gerard R. Strecker
Assistant Examiner—Warren S. Edmonds
Attorney, Agent, or Firm—David Carroll; Martin Novack

[57] ABSTRACT

An apparatus and method for measuring properties of earth formations surrounding a borehole and, particularly, conductivity properties of the formations and certain properties of the invaded zone of the formations. In accordance with one embodiment of the invention, a logging device, movable through the borehole, has a transmitter coil and first and second spaced receiver coils mounted thereon. A short pulse of electrical energy is applied to the transmitter coil. Signals are induced in the first and second receiver coils. A conductivity property of the surrounding formations is then determined as a function of the times of occurrence of predetermined characteristics of the signals detected in the first and second receiver coils. In particular, the elapsed time between a zero-crossing of the signal induced in the first receiver coil and a zero-crossing of the signal induced in the second receiver coil is measured, and the conductivity of the surrounding formations is determined as being substantially proportional to said elapsed time. In another embodiment of the invention the polarities of the initial portions of the signals detected at a number of receiver locations are used in determining properties of the formation invaded zone, particularly its thickness and its conductivity as compared to the virgin formations.

23 Claims, 8 Drawing Figures

PULSED INDUCTION LOGGING FOR DETERMINING CONDUCTIVITY AND INVADED ZONE PROPERTIES

BACKGROUND OF THE INVENTION

This invention relates to the measurement of the properties of subsurface earth formations surrounding a borehole and, more particularly, to an apparatus and method for measuring conductivity and certain properties of the formation invaded zone.

Induction logging has been employed for many years for measuring the conductivity of subsurface earth formations surrounding an earth borehole. In conventional induction logging a number of coils are wound on a mandrel. One or more transmitter coils are energized by an alternating current. The resultant oscillating magnetic field causes induction of currents in the formations which are substantially proportional to its conductivity. These currents, in turn, cause a voltage to be induced in receiver coils.

In the U.S. Pat. No. 3,090,910, there is disclosed a system for measuring the conductivity of formations surrounding a borehole using an induction technique that is different from conventional induction logging. A transmitter coil is energized with a sawtooth current, and the response induced in a spaced receiver coil is detected. The patent teaches that the rapidity of rise of the voltage induced in the receiver coil will vary in value inversely as the conductivity of the medium in the region that is being investigated; i.e., a slow rise time will be indicative of a relatively high conductivity, and a fast rise time will be indicative of a relatively low conductivity. The technique disclosed in the patent, referred to as "inductive probing", is intended to overcome certain limitations of conventional induction logging, for example, problems encountered due to skin effect phenomena and problems caused by measurements being affected by changes in the magnetic permeability of the medium being investigated.

It is an object of the present invention to provide another improved apparatus and method for measuring by induction the conductivity of earth formations surrounding a borehole, and also to provide a technique which is useful in determining properties of the invaded zone of said formations.

SUMMARY OF THE INVENTION

The present invention is directed to an apparatus and method for measuring properties of earth formations surrounding a borehole and, particularly, conductivity properties of the formations and certain properties of the invaded zone of the formations. In accordance with one embodiment of the invention, a logging device, movable through the borehole, has a transmitter coil and first and second spaced receiver coils mounted thereon. Means are provided for applying a pulse of electrical energy to the transmitter coil. The pulse is preferably a unipolar broadband pulse having a duration of less than about 1 microsecond. Means are provided for detecting signals induced in the first and second receiver coils. Finally, means are provided for determining a conductivity property of the surrounding formations as a function of the times of occurrence of predetermined characteristics of the signals detected in the first and second receiver coils. In the preferred embodiment of this form of the invention, the means for determining a conductivity property of the formations includes for means for detecting a zero crossing of the signal induced in the first receiver coil, means for detecting a zero crossing of the signal induced in the second receiver coil, and means for determining the elapsed time between the respective zero crossings. The conductivity of the surrounding formations is determined from the elapsed time, it being substantially proportional to said elapsed time.

In accordance with a further form of the invention, there is disclosed a method for determining a property of the invaded zone of the formations surrounding a borehole. Again, a pulse of electromagnetic energy is generated at a transmitter location in the borehole. Induced electromagnetic energy is detected at a plurality of locations, preferably at least three locations, in the borehole, successively spaced from the transmitter location. The polarity of the initial portion of the energy received at the spaced receiver locations is then detected. Finally, a property of the invaded zone of the formations is determined from the detected polarities. In accordance with the feature of this form of the invention, the step of determining a property of the invaded zone comprises determining the presence or absence of a difference, as between different receiver locations, in the polarity of the initial portion of the energy detected at the spaced receiver locations. The difference is indicative that the invaded zone is more conductive than the non-invaded zone (or virgin formations). Also, by determining the particular receiver location at which the polarity of the initial portion of the energy detected is different than the polarity of the initial portion of the energy detected at the receiver location which is next closest to the transmitter location, one can determine the thickness of the invaded zone as being directly related to the spacing between the transmitter location and said particular receiver location.

Further features and advantages of the invention will become more readily apparent from the following detailed description when taken in conjunction with the accompanying drawings.

DESCRIPTION OF THE PREFERRED EMBODIMENTS

Figure 1:
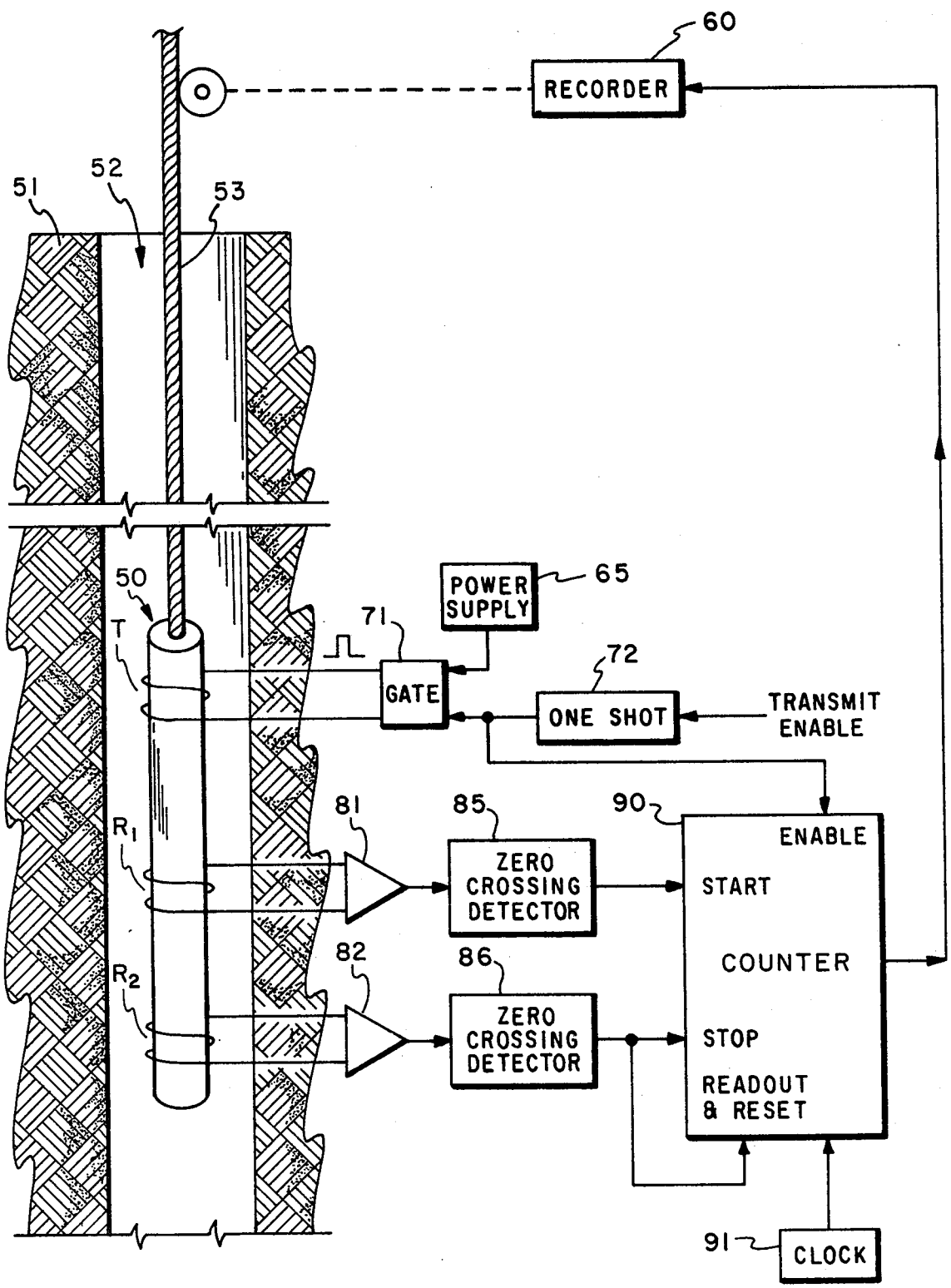
FIG. 1 is a schematic representation, partially in block diagram form, of an embodiment of one form of the invention.

Referring to FIG. 1, there is shown a logging apparatus 50 in accordance with an embodiment of the present invention for investigating subsurface formations 51 traversed by a borehole 52. The investigating apparatus or logging device 50 is suspended in the borehole 52 on an armored cable 53, the length of which substantially determines the relative depth of the device 50. The borehole 52 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. The volume of the formations that is "invaded" by the mud and mud filtrate is referred to as the "invaded zone". Also, the formations tend to screen some of the small particles suspended in the mud so that a mudcake is formed on the walls of the borehole.

The device 50 comprises a sonde which includes a cartridge that typically contains most of the electronics, and a mandrel around which is wound a transmitter coil, designated T, and, spaced therefrom, a pair of spaced receiver coils designated $R_1$ and $R_2$ which are, respectively, close and far receivers of a differential receiver arrangement. Disposed within the cable 53 are electrical conductors which may provide a supply of power from the surface (if desired, although the power supply 65 is shown as being contained within the logging device in the present embodiment), and which also carry electrical signals from the sonde to a recorder 60 at the surface of the earth.

The downhole electronics contained within the device 50 are shown, for convenience of illustration, at the side of the borehole in FIG. 1. Power supply 65 generates a DC level of electrical energy through a high impedance source, the electrical energy being coupled to one input of the gate 71. The gate 71 may be, for example, a silicon-controlled rectifier that is capable of handling a relatively high power signal. The control terminal of the gate 71 receives the output of monostable or one-shot multivibrator 72 which is, in turn, triggered by a transmit enable pulse that is periodically generated by a source not shown. In the present embodiment the one-shot multivibrator 72 has a characteristic "on" time preferably less than about 1 microsecond. During the output pulse of monostable multivibrator 72, the gate 71 is enabled to pass the energy generated by power supply 65, thereby coupling a generally rectangular impulse of electrical energy having a duration of less than about 1 microsecond to the transmitter coil T. The output of monostable multivibrator is also coupled to the enable terminal of a counter 90.

The receiver coils $R_1$ and $R_2$ are respectively coupled to amplifiers 81 and 82 whose outputs are, in turn, respectively coupled to zero-crossing detectors 85 and 86. In the present embodiment, the zero-crossing detectors are of the type that produce an output upon occurrence of a negative-going zero-crossing. The outputs of zero-crossing detectors 85 and 86 are respectively coupled to the "start" and "stop" terminals of counter 90 which receives clock pulses from a clock 91. The signal coupled to the "stop" terminal of counter 90 is also coupled to the readout and reset terminals of counter 90. The count read out of counter 90 is coupled to the surface of the earth and is recorded by recorder 60 as a function of borehole depth.

Figure 2:
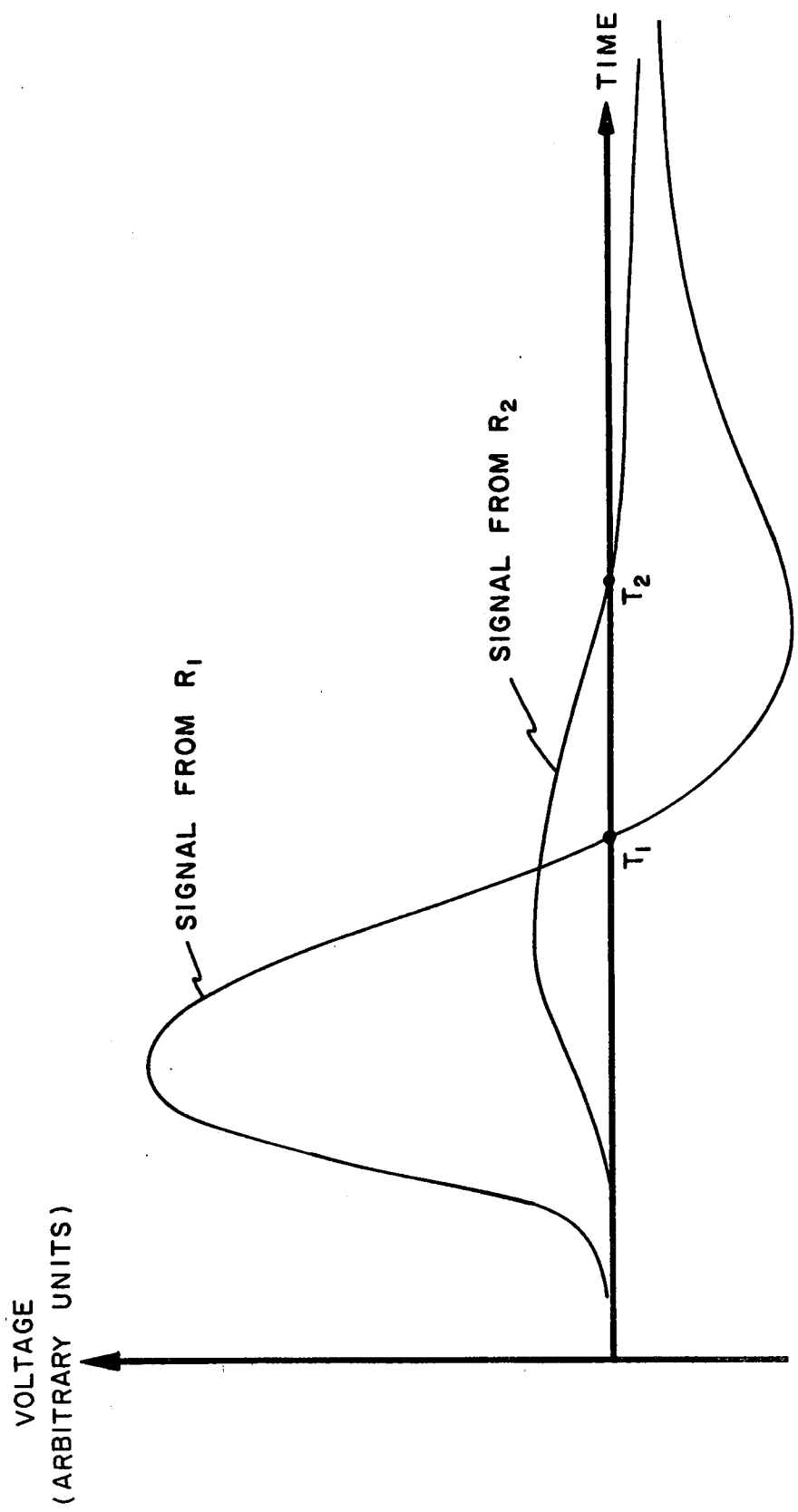
FIG. 2 is a graph of two receiver response waveforms.

Before describing operation of the embodiment of FIG. 1, reference can be made to FIG. 2 which illustrates the type of signals, as a function of time, that are induced in the receiver coils $R_1$ and $R_2$. In the present example, each of the induced voltages is initially positive-going and then has a negative-going zero-crossing which occurs at times designated $t_1$ and $t_2$, respectively, for the signals from $R_1$ and $R_2$. Applicant has determined that the apparent conductivity of the surrounding formations, designated $\sigma_a$, is substantially proportional to $(t_2 - t_1)$, and can be expressed as:

$$\sigma_a \sim \frac{t_2 - t_1}{\mu_o(L_2^2 - L_1^2)} \quad (1)$$

where $\mu_o$ is the magnetic permeability of free space (a constant) and $L_2$ and $L_1$ are respectively the distances between transmitter T and receiver $R_1$ (also constants). The relationship set forth can be determined from a model employing point coil transmitter and spaced receivers in a wellbore medium surrounded by a homogeneous formation, and by solving for the response at the receivers when the transmitter is excited with a broadband pulse.

In operation, it is seen that the recorder signal of FIG. 1 is substantially proportional to the apparent conductivity of the formations in accordance with relationship (1). The times of the negative-going zero-crossings which result in outputs from detectors 85 and 86 of FIG. 1 are respectively representative of the times such as $t_1$ and $t_2$ in FIG. 2. By starting the counter with the output of the zero-crossing detector 85 (at a time $t_1$) and then stopping the counter at the time of occurrence of an output from the zero-crossing detector 86 (at a time $t_2$), it is seen that the counter 90 will contain a final count representative of the time $t_2 - t_1$. This digital count is recorded by recorder 60.

Figure 3:
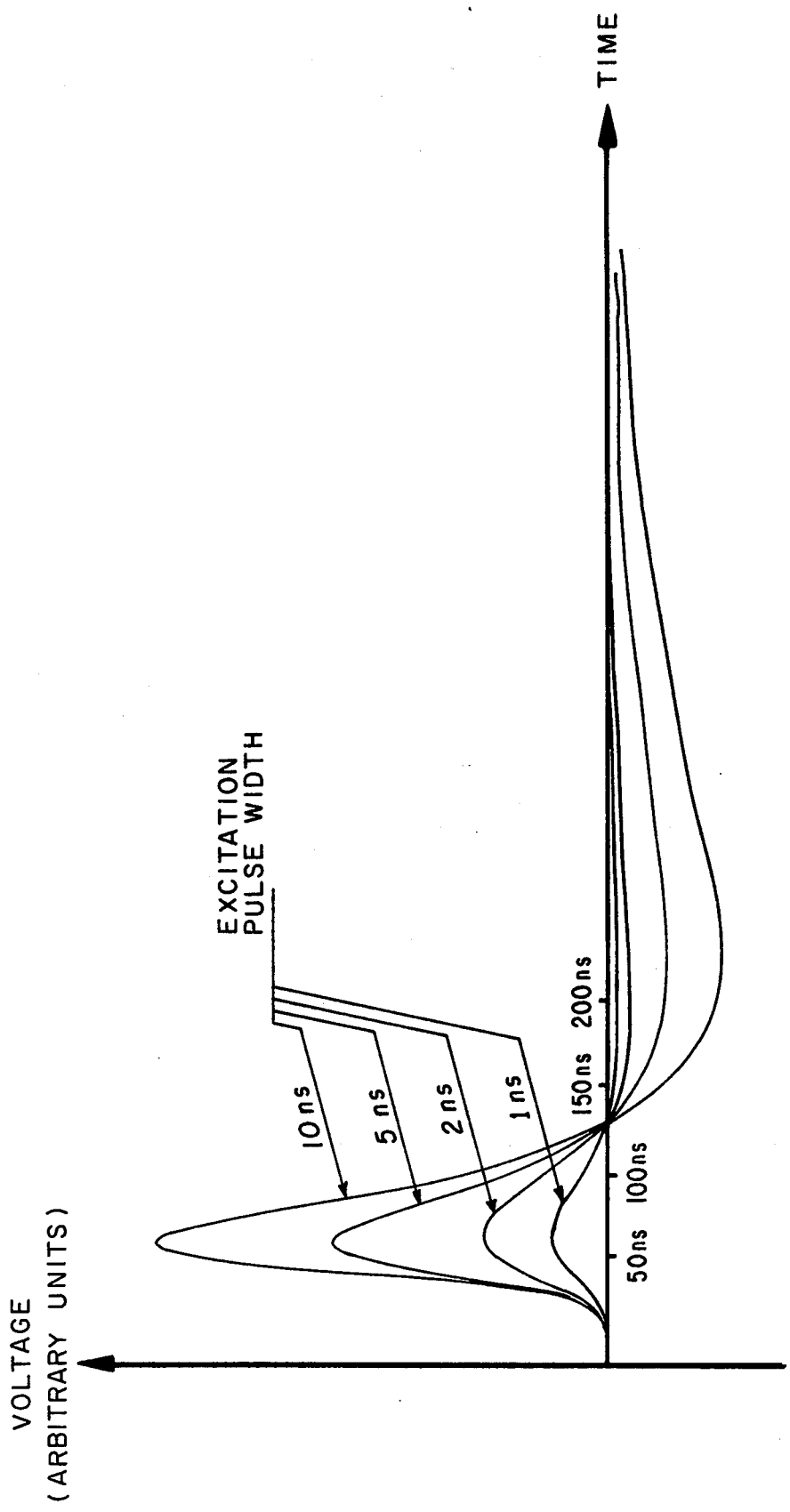
FIG. 3 is a graph of receiver response waveforms for a number of different pulse widths.

The technique of the present invention is relatively independent of the pulse width of the transmitted pulse, for short pulse widths of duration preferably less than about 1 microsecond. FIG. 3 illustrates the response that can be expected at a receiver an arbitrary distance of one meter from the transmitter, as computed for a model comprising a homogeneous medium of conductivity 1 mho/meter for different pulse durations $\tau$. It is readily seen that the zero-crossing time $\tau$ is substantially independent of the transmitter pulse width for pulse widths between 1 and 10 nanoseconds.

In accordance with a further feature of the invention, applicant has discovered that the initial polarity of the received signal, and the receiver distance at which the initial polarity changes, can be utilized in determining characteristics of the invaded zone of the formations surrounding the borehole. In particular, the technique to be set forth can be used to determine the relative conductivity of the invaded zone as compared to the conductivity of the uninvaded zone and, in some cases, to determine the approximate thickness of the invaded zone. Consider the simplified model of FIG. 4 of a section of formation of conductivity $\sigma_t$ with a borehole of diameter DH filled with mud of conductivity $\sigma_m$ and having an invaded zone of conductivity $\sigma_{xo}$ and thickness LI. If a point coil transmitter is positioned in the borehole, one can compute the response that would be expected at a series of receiver positions successively spaced from the transmitter position. FIG. 5 illustrates the response at receiver locations (at the various spacings from the transmitter location indicated in the Figure) for the type of pulse excitation described in conjunction with the FIG. 1 embodiment and with DH=8', LI=4", $\sigma_t$=1 mhos/meter, $\sigma_{xo}$=0.1 mhos/meter and $\sigma_m$=10 mhos/meter. In this example, where the invaded zone has a lower conductivity than the uninvaded zone (or virgin formation), the initial portion of each waveform has the same polarity, that is, a positive polarity.

Figure 4:
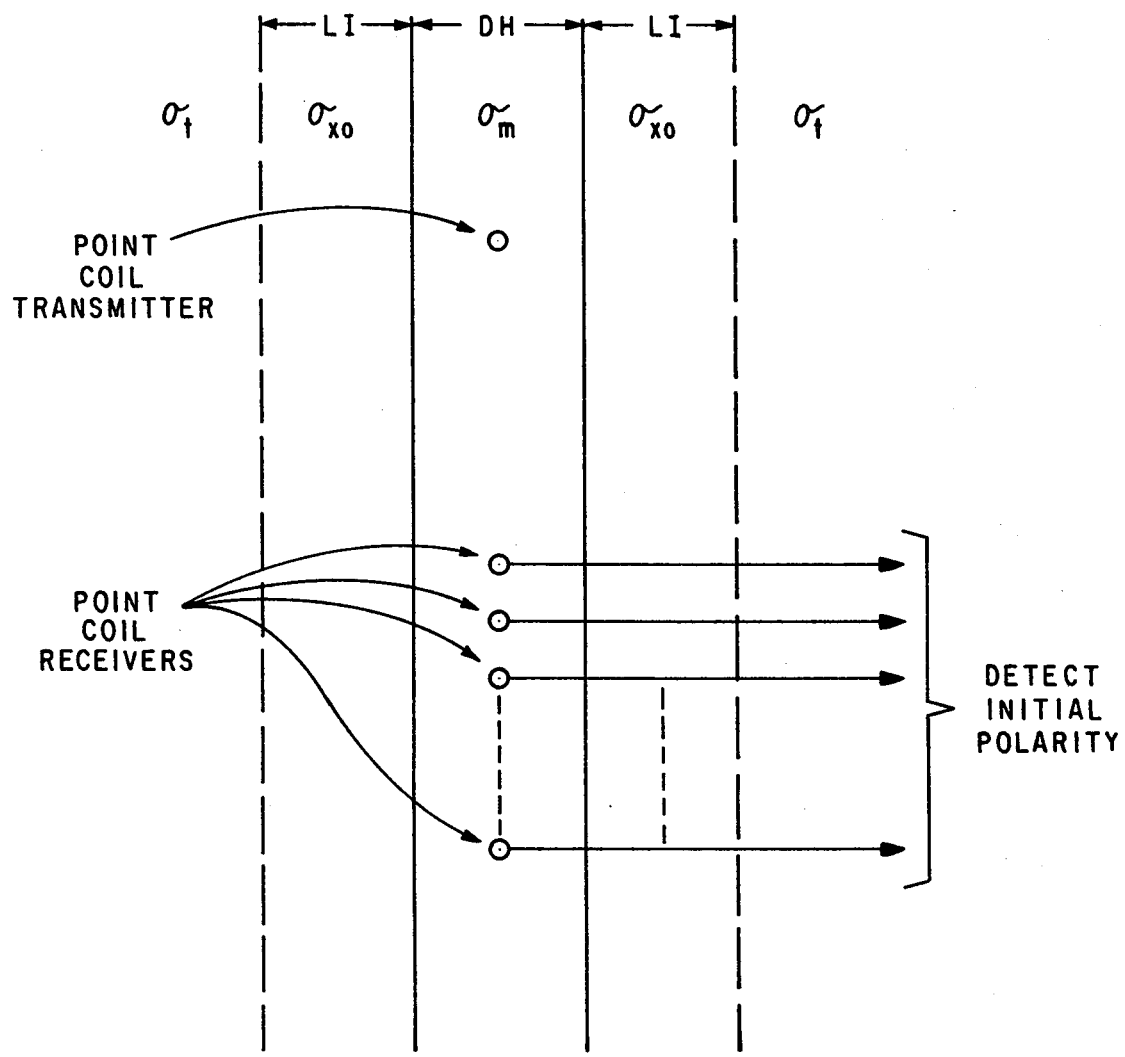
FIG. 4 is a simplified model of a section of earth formation traversed by a borehole, showing a point coil transmitter and a number of point coil receivers, which can be used in practicing the method of another form of the invention.
Figure 5:
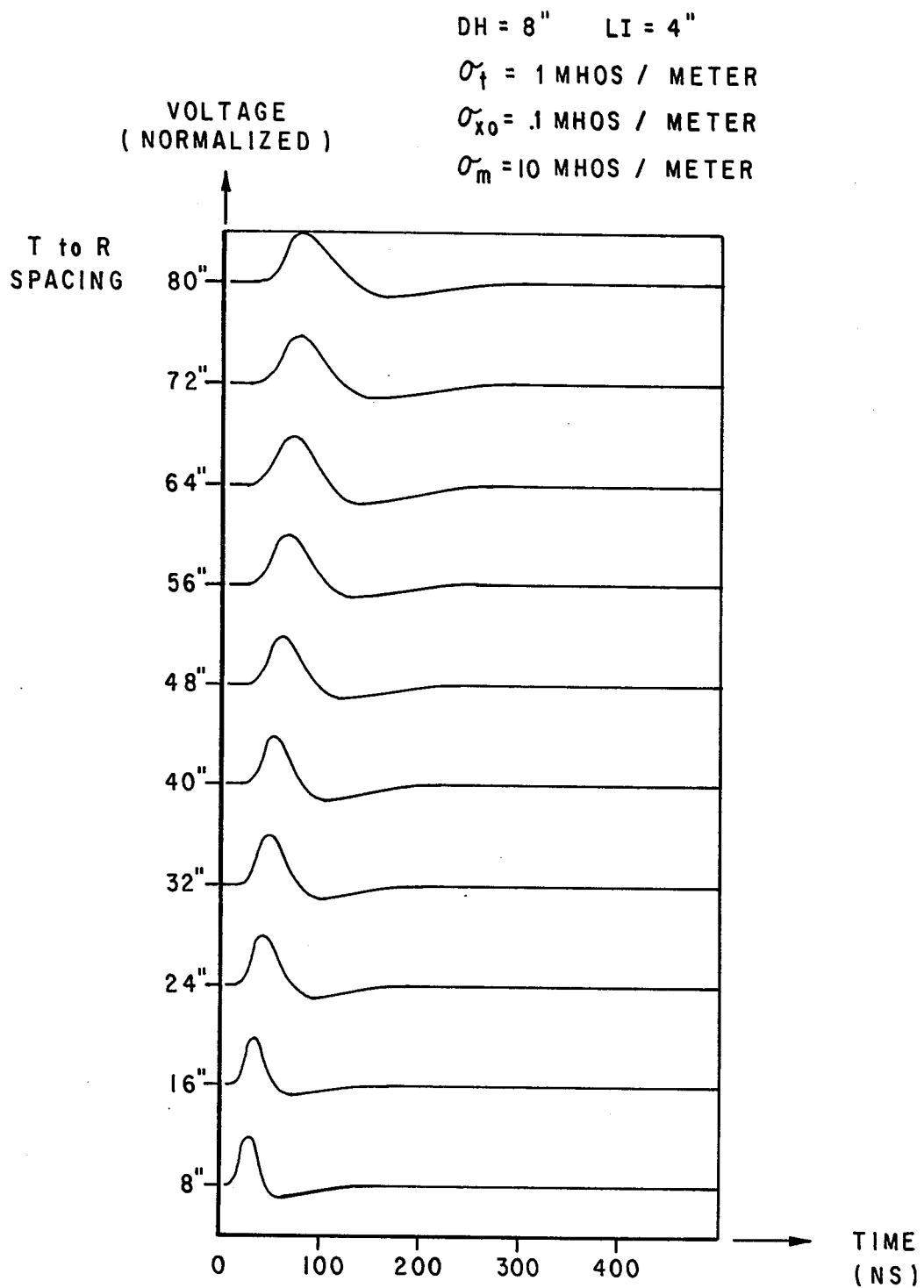
FIGS. 5–8 illustrate the receiver response waveforms at various receiver locations for different versions of the model of FIG. 4.
Figure 6:
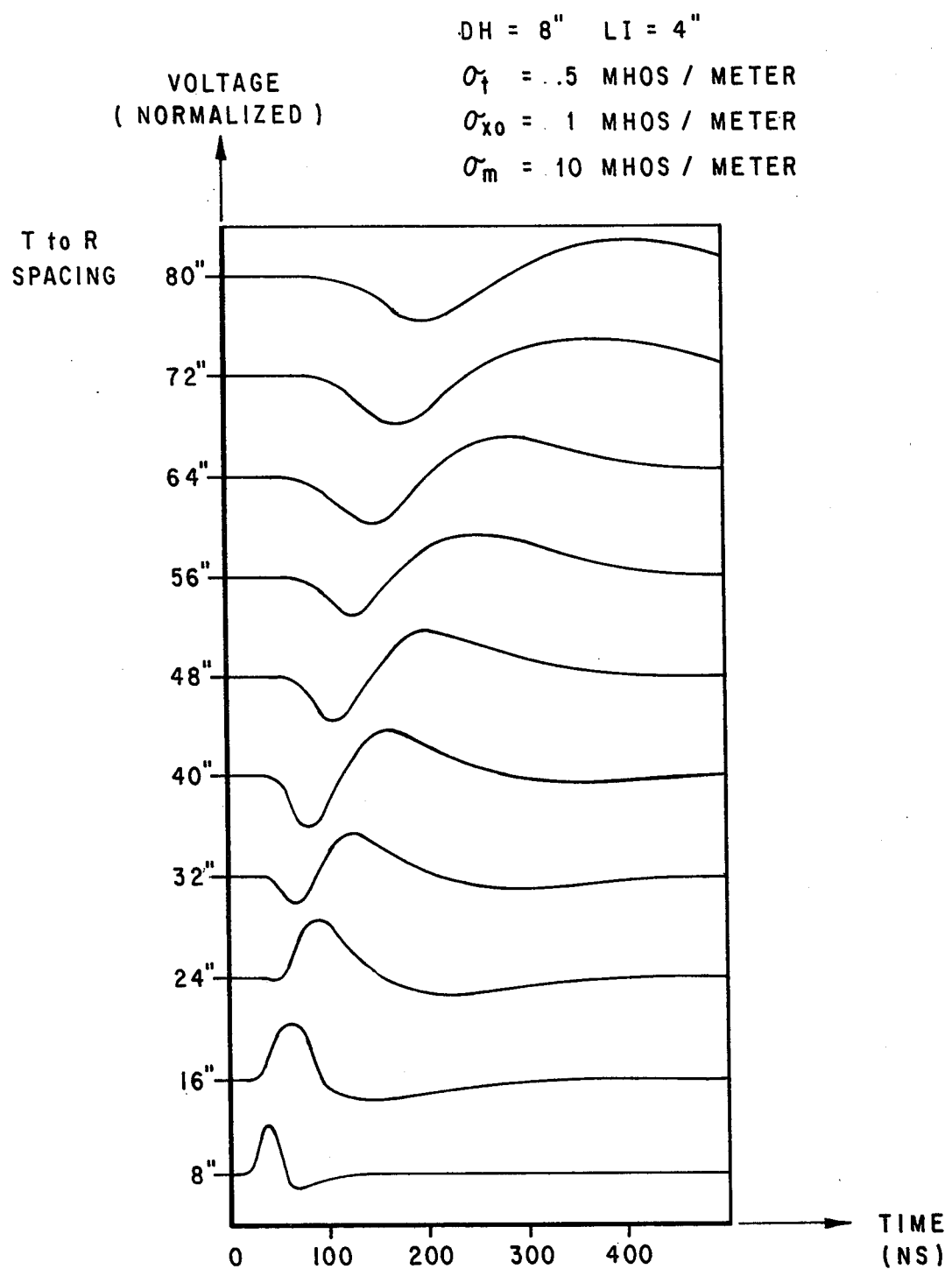
Figure 7:
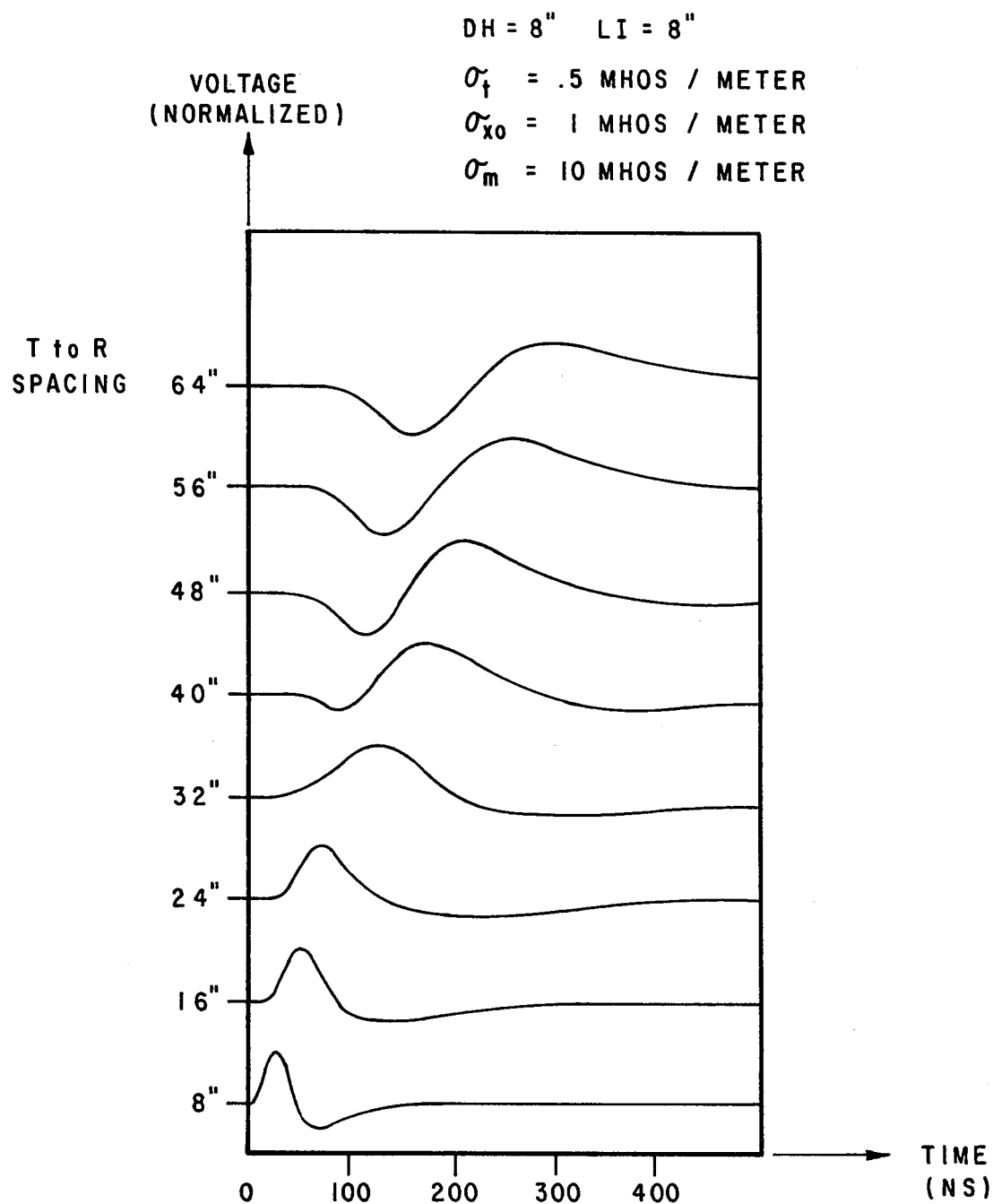
Figure 8:
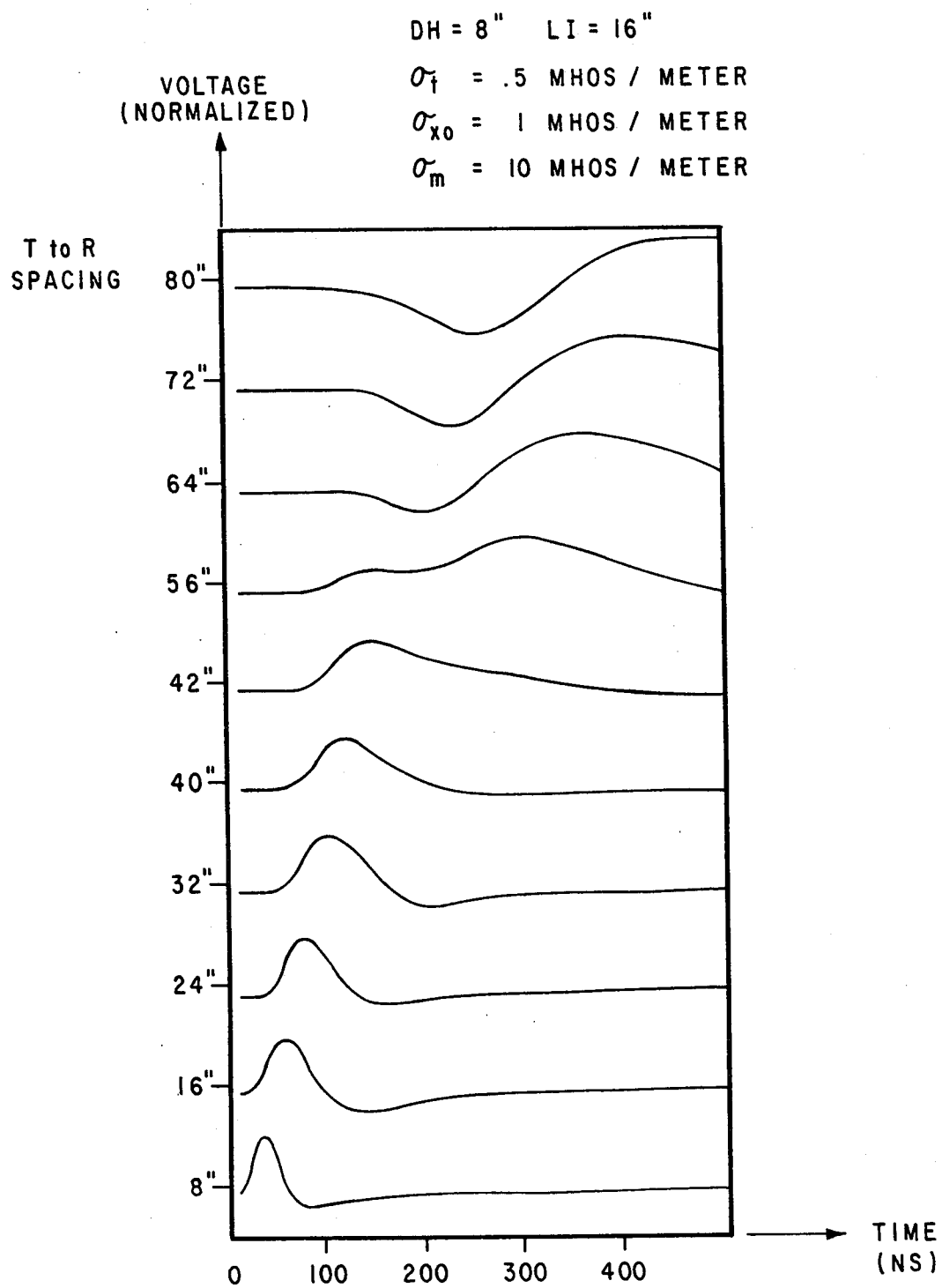

Consider next the FIGS. 6, 7 and 8 waveforms which each represent the receiver signals for a FIG. 4 model wherein the invaded zone has a higher conductivity than the uninvaded zone (in particular, DH=8", LI=4", $\sigma_t=0.5$ mhos/meter, $\sigma_{xo}=1$ mhos/meter, and $\sigma_m=10$ mhos/meter for FIG. 6; DH=8", LI=8", $\sigma_t=0.5$ mhos/meter, $\sigma_{xo}=1$ mhos/meter and $\sigma_m=10$ mhos/meter for FIG. 7; and DH=8", LI=16", $\sigma_t=0.5$ mhos/meter, $\sigma_{xo}=1$ mhos/meter and $\sigma_m=10$ mhos/meter for FIG. 8). In these cases it is seen that at a certain distance from the transmitter the induced receiver voltage changes its nature; i.e., the initial portion of the waveform is negative, rather than positive (as it was for closer receiver locations). Also, applicant has determined that the receiver distance at which the initial waveform polarity first reverses is related to the thickness of the invaded zone, with the receiver distance at which such reversal occurs varying directly with the invaded zone thickness. Accordingly, the polarity information from the multiple receivers of FIG. 4 can be used to determine whether the invaded zone has greater or lesser conductivity than the virgin formation (by determining if an initial waveform polarity change takes place), and can also be used to approximate the thickness of the invaded zone (by determining the receiver spacing at which such polarity reversal occurs).

It will be understood that there are various ways that the method described in conjunction with FIGS. 4-8 can be practiced, including providing multiple receiver elements whose responses are measured either from a single transmitter pulse or multiple transmitter pulses or by moving one or more receivers to different spacings from a transmitter location in the borehole. Detection of initial polarity can be performed by detecting the polarity of the initial zero crossing or by other known means of polarity detection. It will be understood that the embodiment illustrated in FIG. 1 is intended for operation preferably where either the invaded zone is less conductive than the virgin formation or, if not, where the receivers are close enough to the transmitter that polarity reversal will not occur.

The invention has been described with reference to particular embodiments, but variations within the spirit and scope of the invention will occur to those skilled in the art. For example, in the embodiment of FIG. 1, there are various ways in which the energizing pulse can be generated and in which the relative timing of the receiver signals can be measured.

I claim:

1. Apparatus for measuring the conductivity of earth formations surrounding a borehole, comprising:
   a logging device movable through the borehole;
   a transmitter coil and first and second spaced receiver coils spaced from said transmitter coil, all mounted on said logging device;
   means for applying a pulse of electrical energy to said transmitter coil;
   means for detecting signals induced in said first and second receiver coils; and
   means for determining the conductivity of the surrounding formation as a function of the times of occurrence of zero-crossings of the signals detected in said first and second receiver coils.

2. Apparatus as defined by claim 1 wherein said pulse is a unipolar broadband pulse.

3. Apparatus as defined by claim 1 wherein said pulse of electrical energy has a duration of less than about 1 microsecond.

4. Apparatus as defined by claim 1 wherein said means for determining conductivity of said formations includes means for detecting a zero-crossing of the signal induced in said first receiver coil, means for detecting a zero-crossing of the signal induced in said second receiver coil, and means for determining the elapsed time between said respective zero-crossings, the conductivity of the surrounding formations being determined from said elapsed time.

5. Apparatus as defined by claim 4 wherein each of said zero-crossing detecting means is operative to detect the initial zero-crossing of its respective signal.

6. Apparatus as defined by claim 4 wherein said means for determining the elapsed time between said zero-crossings comprises a counter, means for initiating counting by said counter upon detection of a zero-crossing by one of said zero-crossing detectors, and means for terminating counting by said counter upon detection of a zero-crossing by the other of said zero-crossing detectors.

7. Apparatus as defined by claim 4 wherein said pulse of electrical energy has a duration of less than about 1 microsecond.

8. Apparatus as defined by claim 7 wherein each of said zero-crossing detecting means is operative to detect the initial zero-crossing of its respective signal.

9. Apparatus as defined by claim 8 wherein said means for determining the elapsed time between said zero-crossings comprises a counter, means for initiating counting by said counter upon detection of a zero-crossing by one of said zero-crossing detectors, and means for terminating counting by said counter upon detection of a zero-crossing by the other of said zero-crossing detectors.

10. Apparatus as defined by claim 7 wherein said means for determining the elapsed time between said zero-crossings comprises a counter, means for initiating counting by said counter upon detection of a zero-crossing by one of said zero-crossing detectors, and means for terminating counting by said counter upon detection of a zero-crossing by the other of said zero-crossing detectors.

11. Apparatus as defined by claim 7 wherein said pulse is a unipolar broadband pulse.

12. Apparatus as defined by claim 11 wherein said means for determining the elapsed time between said zero-crossings comprises a counter, means for initiating counting by said counter upon detection of a zero-crossing by one of said zero-crossing detectors, and means for terminating counting by said counter upon detection of a zero-crossing by the other of said zero-crossing detectors.

13. Apparatus as defined by claim 11 wherein each of said zero-crossing detecting means is operative to detect the initial zero-crossing of its respective signal.

14. A method for measuring the conductivity of earth formations surrounding a borehole, comprising the steps of:
   generating a pulse of electromagnetic energy at a transmitter location in said borehole;
   detecting induced electromagnetic energy at first and second receiver locations in said borehole successively spaced from said transmitter location; and
   determining the conductivity of the surrounding formation as a function of the times of occurrence of zero-crossings of the energy detected at said first and second receiver locations.

15. The method as defined by claim 14 wherein said pulse of electromagnetic energy is a unipolar broadband pulse.

16. The method as defined by claim 14 wherein said pulse of electromagnetic energy has a duration of less than about 1 microsecond.

17. The method as defined by claim 16 wherein said pulse of electromagnetic energy is a unipolar broadband pulse.

18. The method as defined by claim 14 wherein said step of determining the conductivity of said formations includes: detecting a zero-crossing of the energy induced at said first receiver location; detecting a zero-crossing of the energy induced at said second receiver location; and determining the elapsed time between said respective zero-crossings, the conductivity of the surrounding formations being determined from said elapsed time.

19. The method as defined by claim 18 wherein said step of determining the elapsed time between said zero-crossings comprises initiating counting by a counter upon detection of a zero-crossing of the energy induced at said first receiver location, and terminating counting by said counter upon detection of a zero-crossing of the energy induced at the second receiver location.

20. The method as defined by claim 18 wherein said pulse of electromagnetic energy has a duration of less than about 1 microsecond.

21. The method as defined by claim 20 wherein said step of determining the elapsed time between said zero-crossings comprises initiating counting by a counter upon detection of a zero-crossing of the energy induced at said first receiver location, and terminating counting by said counter upon detection of a zero-crossing of the energy induced at the second receiver location.

22. The method as defined by claim 20 wherein said pulse of electromagnetic energy is a unipolar broadband pulse.

23. The method as defined by claim 22 wherein said step of determining the elapsed time between said zero-crossings comprises initiating counting by a counter upon detection of a zero-crossing of the energy induced at said first receiver location, and terminating counting by said counter upon detection of a zero-crossing of the energy induced at the second receiver location.

* * * * *